Figure 6:
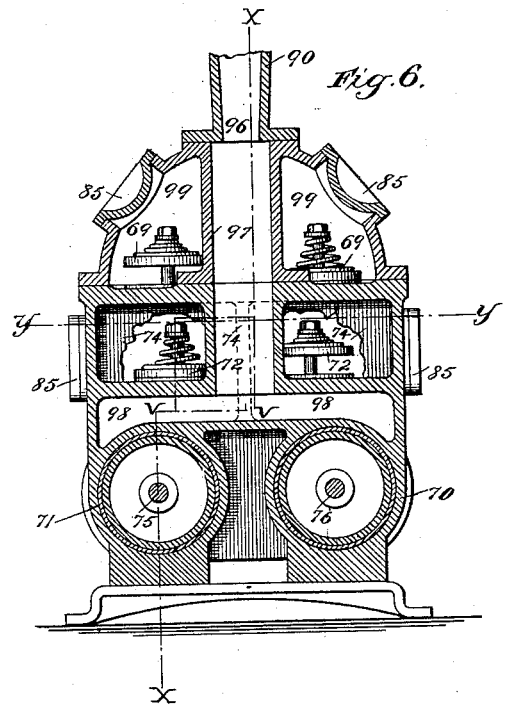

(No Model.)  5 Sheets—Sheet 1.
J. L. ALBERGER & T. SAULT.
CONDENSING APPARATUS FOR STEAM ENGINES.
No. 318,225.  Patented May 19, 1885.
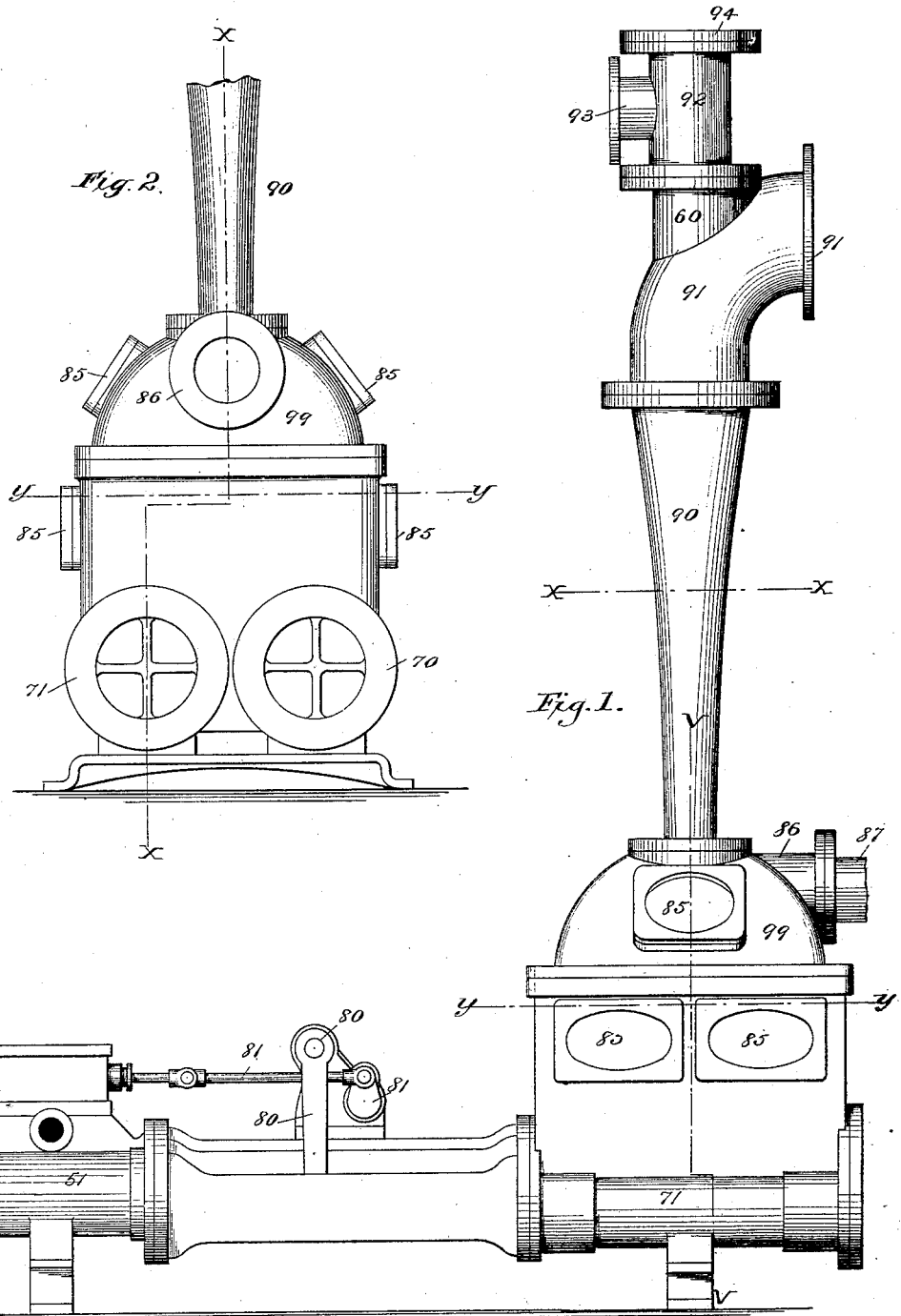
Attest:
A. N. Jasberu
Geo. H. Botts.
Inventor:
John L. Alberger
and Thomas Sault
Attys (No Model.) 5 Sheets—Sheet 2.
J. L. ALBERGER & T. SAULT.
CONDENSING APPARATUS FOR STEAM ENGINES.
No. 318,225. Patented May 19, 1885.
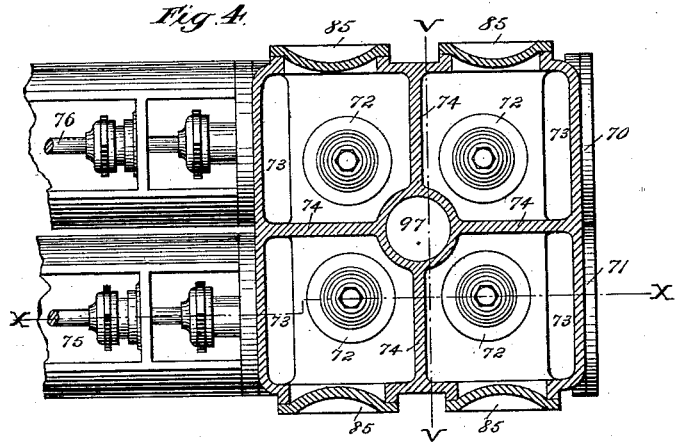
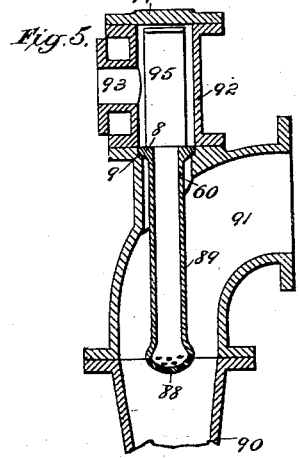
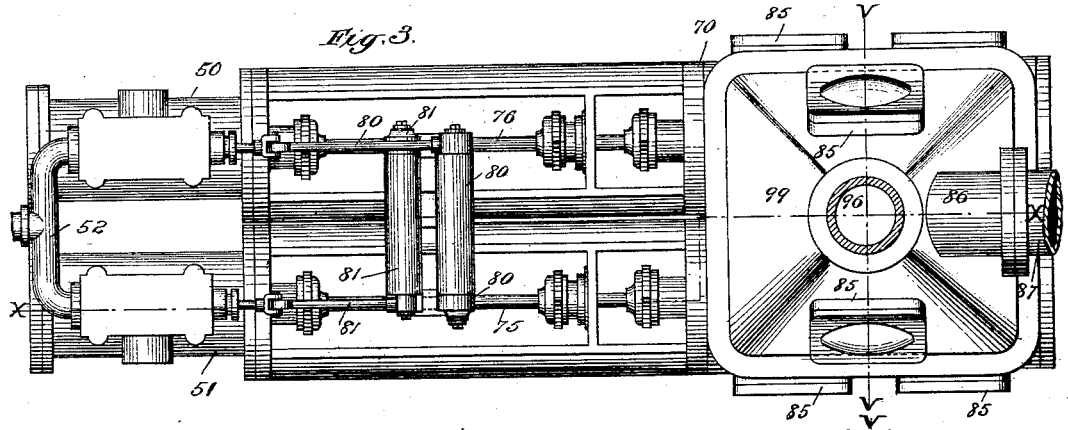
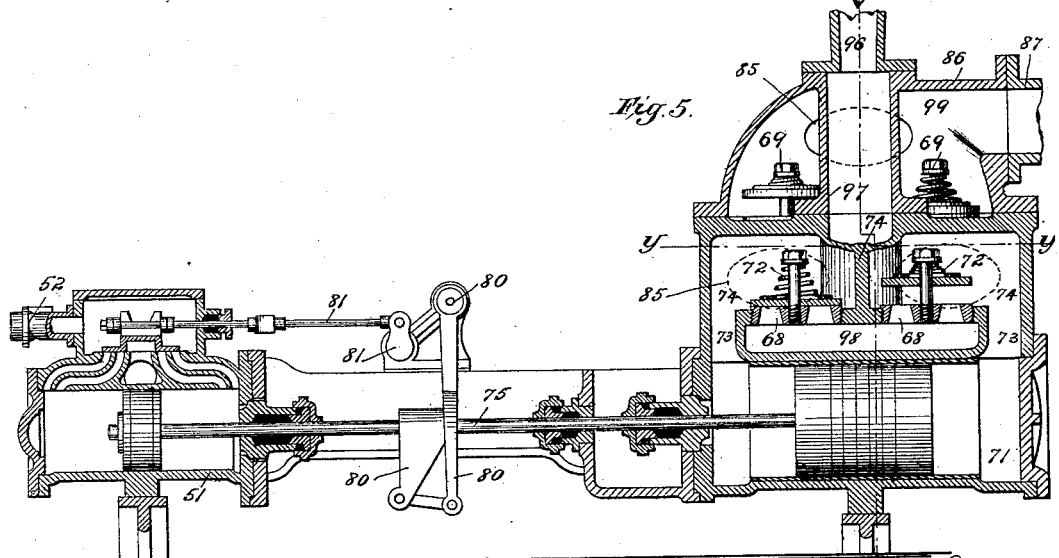
Attest: Geo. H. Botts, James A. Hovey
Inventor: John L. Alberger, Thomas Sault (No Model.) 5 Sheets—Sheet 3.

J. L. ALBERGER & T. SAULT.
CONDENSING APPARATUS FOR STEAM ENGINES.

No. 318,225. Patented May 19, 1885.

Attest:
Geo. H. Botts.
James A. Hovey

Inventor:
John L. Alberger
Thomas Sault
by Munden & Philipp
Attys

N. PETERS, Photo-Lithographer, Washington, D. C.

(No Model.) 5 Sheets—Sheet 4.
J. L. ALBERGER & T. SAULT.
CONDENSING APPARATUS FOR STEAM ENGINES.
No. 318,225. Patented May 19, 1885.
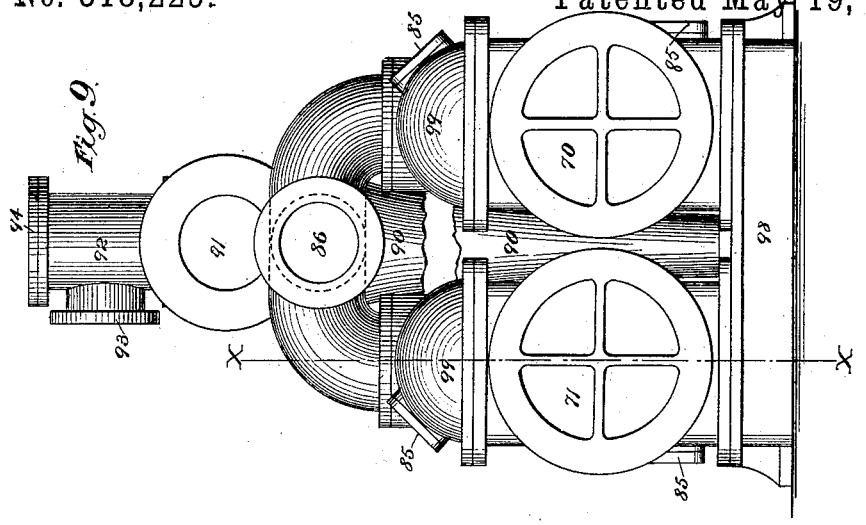
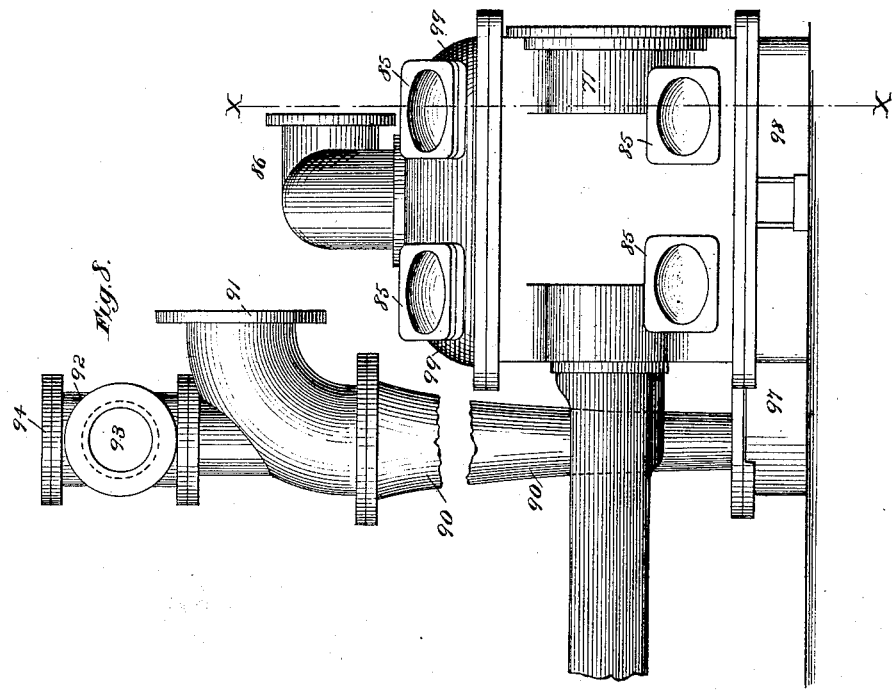

(No Model.) 5 Sheets—Sheet 5.
J. L. ALBERGER & T. SAULT.
CONDENSING APPARATUS FOR STEAM ENGINES.
No. 318,225. Patented May 19, 1885.
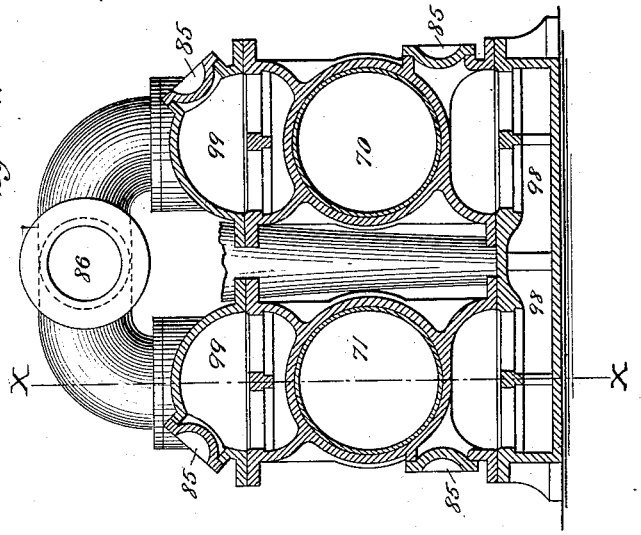
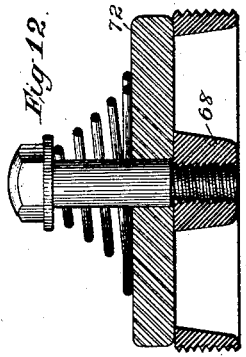
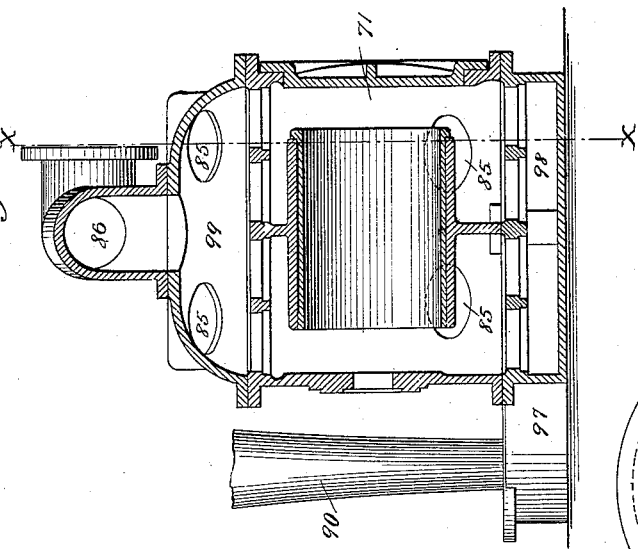
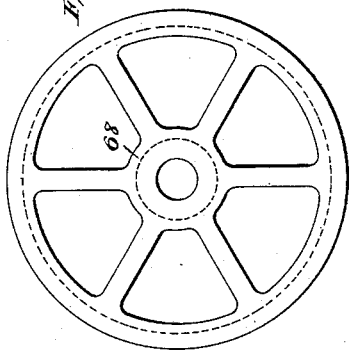

UNITED STATES PATENT OFFICE.

JOHN L. ALBERGER, OF BUFFALO, NEW YORK, AND THOMAS SAULT, OF NEW HAVEN, CONNECTICUT.

CONDENSING APPARATUS FOR STEAM-ENGINES.

SPECIFICATION forming part of Letters Patent No. 318,225, dated May 19, 1885.

Application filed December 29, 1884. (No model.)

*To all whom it may concern:*

Be it known that we, JOHN L. ALBERGER and THOMAS SAULT, citizens of the United States, residing at Buffalo, Erie county, New York, and New Haven, New Haven county, Connecticut, respectively, have invented certain new and useful Improvements in Condensing Apparatus for Steam-Engines, fully described and represented in the following specification and the accompanying drawings, forming a part of the same.

This invention relates, generally, to those condensers which are used in connection with steam-engines, vacuum-pans, and other similar apparatus in which it is necessary or desirable to create and maintain a partial vacuum. The invention relates more particularly, however, to that class of these condensers which are known as "injector" and "ejector" condensers. The condensers of this class as heretofore constructed have been found in practice capable of creating and maintaining an effective and uniform vacuum only in those cases where the injection or condensing water could be supplied under a considerable head, or could be allowed to have a fall of at least thirty-four feet, so as to acquire, either by its head or fall, the necessary velocity to produce and maintain an effective vacuum. This condition rendered these condensers unavailable except in those cases where the condensing-water could be supplied under a considerable natural head, or was raised to a considerable height by pumping machinery especially provided for that purpose, and in all cases its necessary elevation above the end of the discharge-pipe made the condenser a very bulky and cumbersome apparatus. Besides this, to obtain the necessary velocity of the condensing-water very narrow and constricted passages were employed, thus making the apparatus liable to frequent stoppage and derangement. Another objection was due to the fact that a much larger quantity of water was employed than was needed for condensation, thus lowering the temperature of the hot-well, and causing the injection of cool water into the boiler.

It is the object of the present invention to overcome these difficulties, and to provide a condenser of this class which shall be capable of producing and maintaining an effective and uniform vacuum without the necessity of having the condensing-water supplied under any head or fall but a short distance, and without the necessity of using any more water than is necessary to condense the steam and maintain the temperature due to the vacuum employed.

To that end the invention consists, broadly, in providing or combining a condenser of this character with a duplex pump, which is so arranged as to withdraw the mingled air and water from the condenser as fast as it accumulates therein, and thus maintain a uniform and continuous current at a high velocity and without stoppage or interruption.

The invention also embraces various details of construction, both in the condenser proper and in the pump which is used in connection therewith, by which the apparatus is made more compact in form and its parts are rendered more accessible, and by which a more rapid and perfect condensation is effected, all of which will be hereinafter explained, and particularly pointed out in connection with the accompanying drawings, in which—

Figure 7:
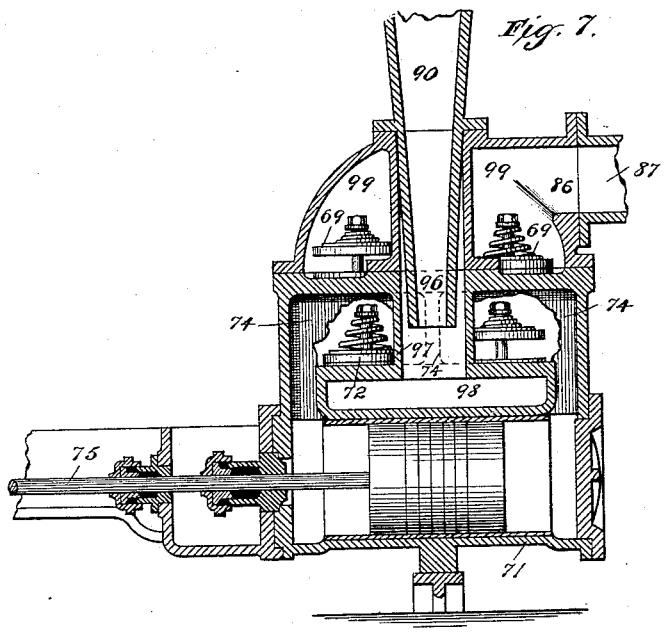

Figure 1 is a side elevation of a condensing apparatus embodying the present invention. Fig. 2 is an end elevation of the same, looking from the right of Fig. 1, the upper part of the condenser proper being omitted. Fig. 3 is a horizonal section taken upon the line $x$ $x$ of Fig. 1, showing the pump in plan view. Fig. 4 is a horizontal section taken upon the line $y$ $y$ of Figs. 1, 2, 5, and 6. Fig. 5 is a sectional elevation taken upon the line $xx$ of Figs. 2, 3, 4, and 6. Fig. 6 is a cross-section taken upon the line $v$ $v$ of Figs. 1, 3, 4, and 5. Fig. 7 is a sectional elevation taken upon lines corresponding to the lines $x$ $v$ of Fig. 6, illustrating a modification which will be hereinafter explained. Fig. 8 is a side elevation of the water-cylinders and condenser proper, illustrating another modification which will be hereinafter explained. Fig. 9 is an end elevation of the same, looking from the right of Fig. 8. Fig. 10 is a sectional elevation of the same, taken upon the line $x$ $x$ of Figs. 8 and 11, the induction and force valves, and also the upper part of the condenser proper, being omitted. Fig. 11 is a similar view taken upon the line $x$ $x$ of Figs. 9 and 10. Fig. 12 is an enlarged sectional view of one of the suction-valves and its seat; and Fig. 13 is a plan view, upon a like scale, of the valve-seat.

Referring to said drawings, it will be seen that the condenser proper, which has been selected for illustration in the present case, is of substantially the same general construction as that shown in United States Letters Patent No. 227,342, granted to us May 11, 1880. It consists, essentially, of a vertical pipe, 90, to the upper end of which is secured a connection, 91, through which the steam to be condensed is introduced from the exhaust of the engine or other source of supply. The upper side of the connection 91 is provided with an opening, 60, which communicates with a small chamber, 92, into which the condensing-water is introduced through an opening, 93, which communicates with a pipe leading to the water-supply, which may be from a head or from any source not more than twenty-five feet below the level of the opening 93. The water-supply pipe will of course be provided with the usual cock or valve for regulating the flow of the water into the condenser.

Extending downward through the opening 60 and for some distance into the pipe 90 is a small pipe, 89, which is provided at its lower end with an enlarged foraminous nozzle, 88. The nozzle 88 may be made integral with the pipe 89, as shown, or it may be made detachable therefrom. The area of the chamber 92 is somewhat greater than that of the opening 60, so that a narrow shoulder or ledge, 9, is formed at the bottom of the chamber, upon which rests a flange, 8, formed upon the upper end of the pipe 89, and which serves to hold the pipe in position. The top 94 of the chamber 92 is made removable, and the pipe 89 is provided with a bail or handle, 95, which extends upward to near the top of the chamber, so that by simply removing the cover 94 the pipe 89 can be readily removed from and replaced in the pipe 90 without disturbing the other parts of the apparatus. This is a feature of considerable importance, as when the condensing-water contains any dirt or sediment the openings in the nozzle 88 are liable to become filled so as to arrest the flow of water, thus making it necessary to remove the same for cleaning. In the construction shown in the Letters Patent referred to this removing of the pipe 89 and the nozzle for cleaning could only be effected by breaking the connection between the condenser and the water-supply pipe, which was very inconvenient and troublesome.

The pipe 90 is gradually contracted from its upper to its lower end, so that the discharge-opening 96 at its lower end is considerably reduced in size. This opening is, however, of such area that when the condenser is in operation the outflow or discharge of mingled air and water will not exceed the capacity of the discharge-opening. The pipe 97 is, as will be observed, considerably larger than the discharge-opening 96, so that as soon as the mingled water and air passing through the condenser have passed the discharge-opening they will be allowed to flow rapidly away, so as to afford no obstruction to the current passing through the condenser.

The construction thus far described is, as already stated, the same, except in the particulars specified, as that shown and described in the Letters Patent before referred to. Reference is therefore made to said Letters Patent for a more specific description of this part of the apparatus, and also for directions as to the arrangement and relative proportions of the different parts.

Where a condenser of this construction, or of any of the constructions common in this general class of condensers, is employed under such conditions that the condensing-water can be supplied under a considerable head, or that the tail-pipe 97 or its equivalent pipe can be made of considerable length—say about thirty-four feet—the velocity of the water, due to the head or the fall of the water through the pipe 90 and the tail-pipe, can be relied upon to form and maintain a sufficient vacuum in the condenser to effect good results; but in many cases it is impossible, or at least very undesirable, to comply with either of these conditions, and in such cases it is necessary to provide means not only for withdrawing the mingled water and air from the condenser, but also for preventing the air from passing upward through the pipe 97, so as to destroy the vacuum.

In order to make the condenser most effective the vacuum must be maintained at a uniform tension, and to do this the water and air must be withdrawn in a steady and uninterrupted stream, so as to produce a steady flow through the condenser.

It has been long a well-recognized fact in the art that the duplex pump, by reason of its peculiar action, is capable of discharging the water or other fluid which it pumps in a more steady and uniform manner than any other known form of pump, not even excepting the rotary. It is therefore manifest that the duplex pump is the most desirable form for use in connection with a condenser. In order, however, to enable the duplex pump to operate successfully, it is necessary that the fluid upon which it operates should be of a uniform or practically uniform density, so that a uniform or practically uniform resistance will be offered to the pistons or plungers throughout the entire stroke. This condition does not exist in an ordinary condenser in which the water and air and uncondensed vapor are allowed to separate before they are withdrawn from the condenser, and consequently all efforts to use the duplex pump in connection with this form of condenser have proved unsuccessful. This was owing to the fact that the fluid upon which the pump operated was not of uniform density, the pump being required to operate for a portion of its stroke upon water, and then for the remainder of the stroke upon air, thus causing the resistance offered to the pistons or plungers to vary during different parts of the stroke, and causing the pump to move spasmodically and in such manner that the condenser was not properly evacuated.

It was not known prior to our invention that the conditions necessary to the successful operation of the duplex pump could be obtained in any form of condenser; but we have found that by the use of the injector or ejector condenser, and particularly by the use of the condenser shown in our prior patent, before referred to, the condensing-water and the water resulting from the condensation of the steam, together with the uncondensed vapor and the air drawn into the condenser, are, when delivered from the condenser, so thoroughly commingled as to form a fluid of a practically-uniform density, or at least of a sufficiently-uniform density to make it practical to employ the duplex pump for evacuating the condenser.

The duplex pump shown in the present case is as to its general construction the same as the well-known Worthington duplex pump. It consists of two steam-cylinders, 50 51, which receive steam from the boiler through the pipe 52, and are provided with the well-known connections 80 81, by which the induction and exhaust valve of each cylinder is operated from the piston-rod of the other, and two water-cylinders, 70 71, which communicate with suction and force chambers 98 99, and the plungers of which are connected directly to the piston-rods 75 76 of the steam-cylinders.

The construction and operation of this class of pumps are so well understood by those familiar with the art that no further description of its features, except those which are novel, is considered necessary in the present case. The tail-pipe 97 may open into or communicate directly with the suction-chamber 98 of the pump when said chamber is located in any of the positions in which it is commonly placed in this class of pumps; but for the sake of economy in the construction, and to secure compactness in the apparatus, the suction-chamber will preferably be arranged as shown in Figs. 1 to 7, inclusive, as this construction will permit the condenser proper to be located directly above the pump, and the tail-pipe 97 to pass directly downward through the force-chamber and be entirely inclosed within the pump-casing. In this construction both of the water-cylinders and the suction and force chambers are inclosed within a single shell or casing, the water-cylinders 70 71 being located at the bottom, the force-chamber 99 at the top, while the suction-chamber 98 is located directly above the water-cylinders and beneath the force-chamber. The pipe 90 is mounted upon the top of the casing inclosing these parts, and the tail-pipe 97 passes downward through the force-chamber and opens into the top of the suction-chamber in close proximity to the suction-valves. The space between the suction and force chambers is divided into four compartments by partitions 74, and these compartments form chambers for the suction-valves 72, which open upward upon the upper side of the suction-chamber. The chambers containing the suction-valves are provided at their ends with passages 73, which open downward past the ends of the suction-chamber into the opposite ends of the water-cylinders. The force-valves 69 are located on the bottom of the force-chamber and control openings which communicate with the four chambers in which the suction-valves are located. The force-chamber is provided with the usual connection, 86, to which the discharge-pipe 87 is attached, and both the force-chamber and the chambers for the suction-valves are provided with suitable hand-holes, as 85, through which access can be had to the valves. The suction and force valves may be of any approved construction, but will preferably be of the form shown in Fig. 12. The valve-seat 68 will also be preferably of the form shown in Fig. 13, and will be arranged to project a short distance above the surrounding surface, so that sediment will be prevented from accumulating beneath the valves.

The operation of the condensing apparatus just described is as follows: Steam being admitted to the cylinders 50 51, so as to set the pump in motion, a vacuum will be formed in the condenser, engine, and water-supply pipe, which will cause the condensing-water to flow in through the pipe 89 and nozzle 88 into the pipe 90. The engine being then started, the exhaust-steam will enter through the connection 91, above the spray from the nozzle 88, and, coming into contact with the water, will be rapidly condensed. The velocity of the steam entering the condenser will be communicated to the water, which also enters at a velocity due to the draft of the vacuum, so that the whole will pass downward through the pipe 90 and into the pipe 97 and chamber 98 at a high velocity, carrying with it in a thoroughly-commingled condition all the air or uncondensed vapor which enters the condenser with the steam. The commingled air and water which thus enter the chamber 98 will be withdrawn by the pump and discharged into the force-chamber 99 before its velocity is entirely checked, or sufficient time or space allowed for separation. From the force-chamber 99 the water may be allowed to flow through the pipe 87 to a hot-well; or it may be delivered into a tank at any desired height above the pump. The duplex pump, by reason of its peculiar action, causes the mingled air and water to be withdrawn from the chamber 98 in a continuous and uninterrupted stream, thereby preventing it from rising and falling in the pipe 97, so as to check or vary the current passing through the pipe 90. This is a fact of great importance, as the effectiveness of the vacuum depends upon its being maintained at a uniform tension, which uniformity of tension can only be maintained by a steady withdrawal of the air and water. It is also to be remarked that the momentum of the mingled air and water as it passes through the condenser is utilized in aiding the pump, (it having been demonstrated in practice that with a vacuum of twenty-eight inches in the condenser, and the water-supply convenient, the pump can be made to work against a resistance from the atmosphere of only about six inches.) This action is directly the reverse of that of the ordinary air-pump and condenser, in which the air and water are allowed to separate before being delivered to the pump. To evacuate the condenser in such case, the pump must maintain a vacuum of greater tension than that in the condenser and upon a larger space, in order to entrap the attenuated air and cause it to flow from the condenser to the pump. At the same time the pump must work against a resistance equal to the full vacuum attained.

In the apparatus just described only about three per cent. more space is required in the pump-cylinders to discharge the mingled air and water than would be required to discharge simply the condensing-water. With the apparatus just described the commingling of the air and water is so perfectly effected as to give the pump a perfectly smooth and even action, thereby permitting the water to be delivered at any height without impairing the effectiveness of the condenser. This is a feature of great importance in many cases where it is desired to force the water into an elevated reservoir for further use, as it avoids the necessity of providing a special pump for that purpose.

It will be observed that in the construction shown in Figs. 1 to 6, inclusive, the condenser proper is placed entirely above the pump-casing, the tail-pipe 97 alone being within the casing. If it should be desired to make the apparatus still more compact, the lower end of the pipe 90 may be made to extend downward into the pipe 97, as shown in Fig. 7, and by this means the height of the apparatus may be considerably reduced without affecting its efficiency.

If for any reason it should be desired to locate the suction-chamber below the water-cylinders, it may be done, as shown in Figs. 8 to 11, inclusive, the pipe 90 being arranged to pass downward either between the two water-cylinders or at one end of them. If the pipe 90 is located at the end of the water-cylinders, the tail-pipe 97 may be arranged horizontally and form an extension of the suction-chamber, as shown in Figs. 8 to 11. The two water-cylinders may be provided with a single force-chamber into which both discharge their water; or they may be provided with separate force-chambers which communicate with a common outlet, as shown; or, in fact, the water end of the pump may be constructed in any of the ways common in this class of pumps. It is also to be understood that the construction of the steam end of the pump may be varied within wide limits without departing from the invention. Each side, instead of consisting of a single cylinder, may consist of compound cylinders; or, in fact, the steam end of the pump may be constructed and arranged in any of the well-known ways so long as the duplex principle is preserved.

In conclusion, it is also to be remarked that the condenser proper may be of a different construction from that shown without departing from the invention. The form shown has been selected for the purpose of illustration, because, all things considered, it is regarded as the best form known for use in this combination; but any of the other well-known forms of injector or ejector condensers may be substituted without departing from the essential feature of the invention.

What we claim is—

1. A condensing apparatus for steam-engines, vacuum-pans, and similar apparatus, consisting of a duplex pump and an injector or ejector condenser, the two being combined and arranged to co-operate substantially as described.

2. A condensing apparatus for steam-engines, vacuum-pans, and similar apparatus, consisting of the duplex pump and an injector or ejector condenser which is arranged to communicate directly with the suction-chamber of the pump, substantially as described.

3. A condensing apparatus consisting of the duplex pump, the enlarged tail-pipe 97, communicating directly with the suction-chamber of the pump, the pipe 90, and the nozzle 88, substantially as described.

4. A condensing apparatus consisting of the duplex pump, the enlarged tail-pipe 97, inclosed within the pump-casing and opening into the suction-chamber, the pipe 90, and the nozzle 88, substantially as described.

5. The combination, with the pipe 90, of the chamber 92, having the removable cover 94, and the pipe 89, having the nozzle 88 and bail 95, substantially as described.

In testimony whereof we have hereunto set our hands in the presence of subscribing witnesses.

JOHN L. ALBERGER.
THOMAS SAULT.

Witnesses to signature of John L. Alberger:
HORACE WILLIAMS,
LOUIS R. ALBERGER.

Witnesses to signature of Thomas Sault:
J. A. HOVEY,
T. H. PALMER.